V. E. LANE.
INSULATED WALL STRUCTURE.
APPLICATION FILED APR. 6, 1912.
1,140,687.
Patented May 25, 1915.
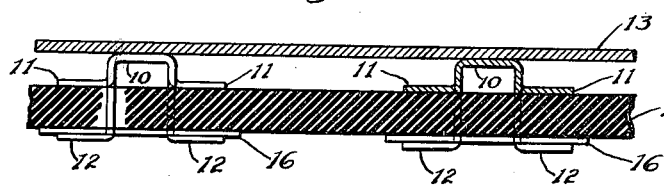
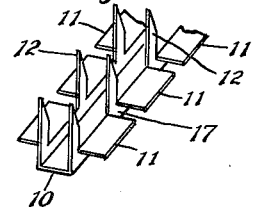
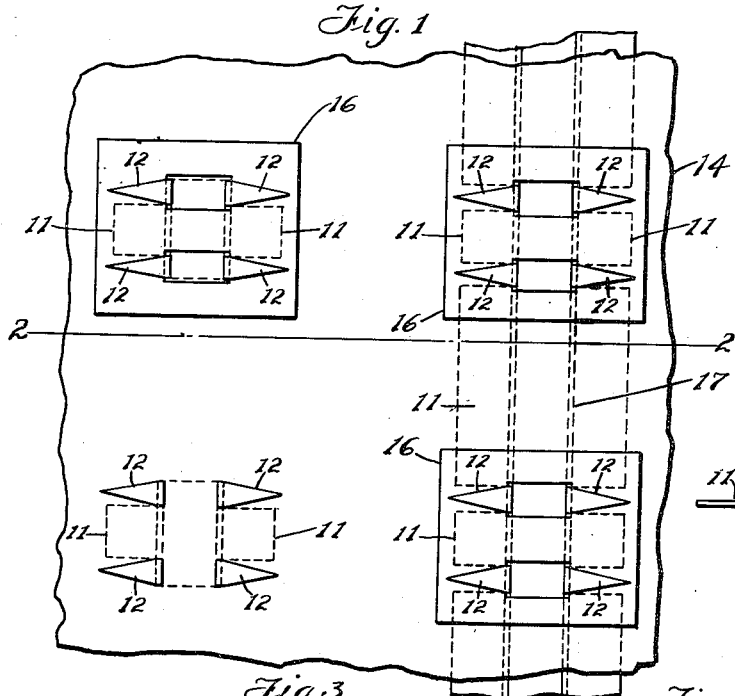
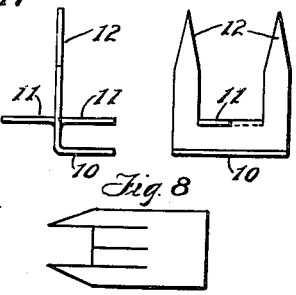
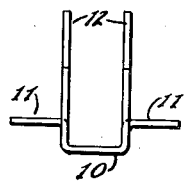
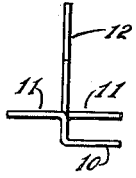
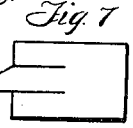
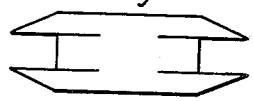
WITNESSES
Frank J. Lynch
H. N. Hennessy
INVENTOR
Victor E. Lane
BY
F. H. Gibbs
ATTORNEY

UNITED STATES PATENT OFFICE.

VICTOR E. LANE, OF NEW YORK, N. Y., ASSIGNOR TO AMERICAN CAR AND FOUNDRY COMPANY, OF ST. LOUIS, MISSOURI, A CORPORATION OF NEW JERSEY.

INSULATED WALL STRUCTURE.

1,140,687.  Specification of Letters Patent.  Patented May 25, 1915.

Application filed April 6, 1912. Serial No. 689,012.

*To all whom it may concern:*

Be it known that I, VICTOR E. LANE, residing at New York, N. Y., and being a citizen of the United States, have invented a certain new and useful Improvement in Insulated Wall Structures, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 represents a fragment of the insulation showing the method of fastening. Fig. 2 represents a section of the same on the line 2—2. Fig. 3 shows a front and end view of a fastener with center or spear points. Figs. 4 and 5 are modifications of the same. Figs. 6, 7 and 8 represents blanks from which Figs. 3, 4 and 5 are stamped but showing an off center form of point which may be adopted to save material. Fig. 9 represents a perspective of a rib fastener utilizing the off center point and is adapted to be employed as shown in dotted lines at the right of Fig. 1.

The main object of this invention is to produce an effective insulation for metal vehicle bodies and contemplates the utilization of a dead air space between the steel body and the insulation and the employment of a special form of fastener so formed as to space the insulation from the metal body and at the same time rigidly secure the insulation to the metal of the body. It also contemplates the utilization of a strengthening rib fastener where it is desired to employ very thin insulation, which is possible owing to the dead air space between the metal body and the insulation.

In the adaptation of this invention as shown in the drawings, scrap steel is stamped into the shapes of Figs. 6, 7 and 8 and then pressed into the shapes of Figs. 3, 4 and 5, or a steel strip is shaped into the form of Fig. 9. As the method of attaching the insulation is the same in all modifications it is only necessary that the fastener possess the same general details, a flat portion 10, offset shoulder portions 11, 11 and a pointed portion 12.

In each of the forms shown the portion 10 serves as a broad bearing surface, which is of sufficient area to permit the application thereto of suitable welding means, as a welding tool, adapted to weld the same to a metal wall of a car or other vehicle, and said flat portion 10 is secured to the metal body or wall 13 by the usual point welding process at suitable intervals. Secured to the wall 13 by the clips or fasteners is a sheet of insulation 14, which insulation is impaled upon the pointed portions 12 of the clips until such pointed portions 12 protrude therethrough and the insulation rests upon the shoulders 11, which are formed as offset portions of the clips, comprising the parts 10, 11 and 12, before indicated. Said offset portions or shoulders are formed at what may be considered, in view of the character of said clip, a considerable distance from the bearing portion 10 and intermediate the bearing portion 10 and the pointed portion 12 of the clips. The protruding pointed portions are turned down over the insulation and form outer supporting shoulders for the insulation, and with the inner shoulders 11 hold said insulation firmly spaced from the metal body. As the pointed portions 12 are of considerably less area than the shoulder portions, a washer 16, suitably punctured, may be slipped over the pointed portions and said pointed portions bent down thereupon, forming an effective fastening means of considerable area. It is obvious that a number of these fasteners must be used at suitable intervals to suitably secure the insulation and, as they are easily applied, can be disposed at will.

The reinforcing rib fasteners 17, shown at the right-hand portion of Fig. 1 interlocked with the insulation, shown detached in Fig. 9, is particularly designed for securing in position heavy insulation plates or sheets, and comprises a continuous channel portion, best shown in Fig. 9, with spaced pointed portions 12 projecting therefrom, and intermediate said spaced pointed portions are the offset flanges or shoulders 11, which are adapted to serve as stops, against which the sheet of insulation is held at one side, while the pointed portions 12 hold the insulation at the opposite side. It will be noted that the clips for supporting the insulation are secured to the continuous imperforate wall surface 13 and impale the insulation 14, being projected through the body portion thereof, remote from its edges.

Owing to the nature of the insulation, which is generally composed of frail cellular material, it is impracticable to secure it in position by merely clipping or binding its edges and depending upon such edge grip to support and hold it in position, hence it is evident that the pointed portions 12 should be projected through the body portion of such insulation at some distance from its edges, as shown in Figs. 1 and 2.

To secure proper insulation, it is evident that the area of the sheet of insulation, or sheets where more than one are used, should be co-extensive with the inner face of the wall to which such insulation is secured. The metal wall should, as shown, be continuous and free from unclosed perforations, so as to be in effect imperforate. It is also apparent that in being projected through the previously imperforate wall of insulation the pointed portions 12 of the fastening clip make self-conforming perforations which closely fit the clip and will not permit the admission or passage of air to the dead air space.

What I claim is:—

1. In an insulated wall structure for cars and the like, the combination with a metallic side plate and a spaced insulated sheet, of means for maintaining the plate and sheet in spaced relation and for securing the same together at different points consisting of a plurality of members, each having flat base parts fixedly secured to the said metal plate, outstanding sheet supporting parts spaced from the base parts, and prongs passing through the perforations in the insulated sheet having their outer ends bent to overlie the sheet, substantially as described.

2. In an insulated wall structure for cars and the like, the combination with a metallic side plate, of a plurality of spaced insulating supporting and securing members welded to the side plate, each member having an attaching base part, intermediate outstanding supporting portions separated from the base part, and prongs projecting outwardly, and an insulated sheet through the material of which the prongs of said supporting and securing devices pass, said sheet resting against said outstanding parts and being secured in place by the prongs, substantially as described.

In witness whereof I have hereunto set my hand in the presence of two witnesses.

VICTOR E. LANE.

Witnesses:
 FRANK J. LYNCH,
 G. V. WASHINGTON.